UNITED STATES PATENT OFFICE.

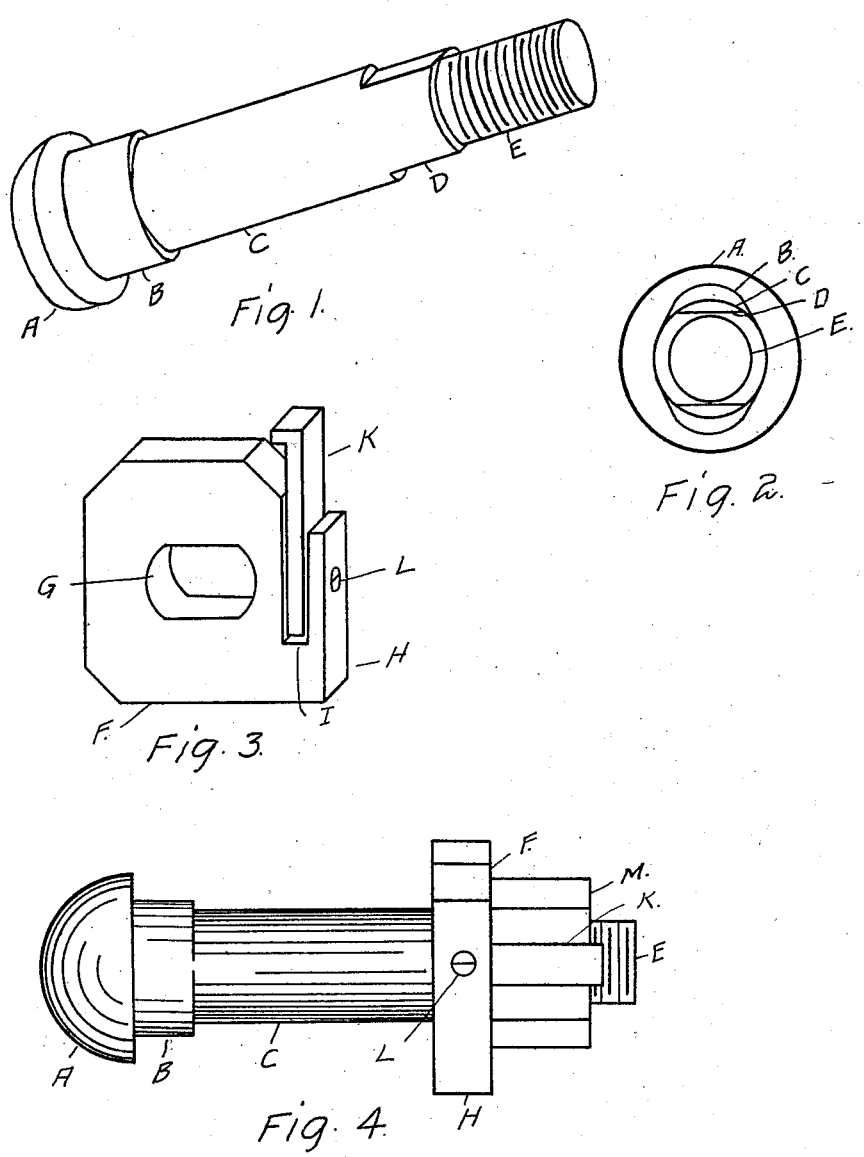

BURT C. JAMES, OF EAST LIBERTY, OHIO.

BOLT AND NUT-LOCK.

No. 929,223.  Specification of Letters Patent.  Patented July 27, 1909.

Application filed May 18, 1908. Serial No. 433,569.

*To all whom it may concern:*

Be it known that I, BURT C. JAMES, a citizen of the United States, residing at East Liberty, in the county of Logan and State of Ohio, have invented a new and useful Improvement in Bolts and Nut-Locks, of which the following is a specification.

My invention relates to certain improvements in bolts and lock nuts, and consists in the shape of the bolt and the locking device, with relation to the position of the nut on the threaded end of the bolt.

Figure 1 is a perspective view of my bolt. Fig. 2 an end view. Fig. 3 a perspective of my locking device or washer. Fig. 4 is a side elevation of my bolt, washer, lock and nut, assembled as in use.

In the drawings A represents the head of the bolt. B an elliptical swell on the bolt. C the body of the bolt. D a part having two sides of the bolt cut away, and E the threaded portion of the bolt, smaller than the main portion C.

In Fig. 3 an octagonal locking washer G has an oblong opening in its center to allow of its slipping on part D, of the bolt and in one side of the washer, which is prolonged at H, is a slot I in which is pivoted a latch K which when all parts are in position, turns down across one of the faces of the nut and prevents its turning. The outer end of the latch is turned over at right angles and fits over the end of the nut and provides additional security against the nut turning on the bolt.

The object of my invention is to provide a bolt and washer by which the nut is locked in a perfectly secure manner, and one in which the nut is easily and readily put on or removed. To accomplish this I make an elliptical swell or cam on the body of my bolt, which, fitting in a hole of similar shape in a railroad rail or other object, is prevented from turning as the nut is screwed on, or unscrewed. Railroad rails already have this oblong hole in them. Near the outer end of my bolt adjacent to the threaded part, two opposite sides of the bolt are cut away and a washer with a hole to fit this part of the bolt is fitted on. The nut, having an octagonal or other plain face is screwed up against the washer, and the latch, hinged in one side of the washer, is let down into a horizontal position across and against the face of the nut M on that side, the end of the latch, bent inward, at right angles, resting against and in front of the outer end of the nut, thus doubly locking the nut onto the bolt, and preventing any loosening of the same.

To accommodate the bolt to rails or other objects of different thicknesses, the part D of the bolt is made longer than the thickness of the washer, which can be moved to or out on the bolt to suit the thickness of the objects to be bolted.

The latch pin or lock K, is pivoted so that when dropped across the side of the nut, it rests upon the bottom of the slot I in a horizontal position, or preferably with the outer end a little lower than a horizontal.

What I claim is:

The combination with a non-rotatable bolt having a screw-threaded end, a nut, of a lock for the nut comprising a washer adapted to be mounted non-rotatably upon said bolt and supported solely thereby, said washer being provided with a vertical slot at one side, having its lower end closed, and a vertically operating latch provided with an angular portion at its free end pivoted in said slot, adapted to engage the side and face of the nut and the bottom of the slot, when in a locking position.

BURT C. JAMES.

Witnesses:
C. D. CAMPBELL,
LEWIS S. HORN.